US012080953B2

(12) United States Patent
Hattori

(10) Patent No.: US 12,080,953 B2
(45) Date of Patent: Sep. 3, 2024

(54) MONITORING DEVICE AND MONITORING SYSTEM

(71) Applicant: Mitsubishi Electric Corporation, Tokyo (JP)

(72) Inventor: Tomohiro Hattori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1165 days.

(21) Appl. No.: 16/628,685

(22) PCT Filed: Oct. 26, 2017

(86) PCT No.: PCT/JP2017/038764
§ 371 (c)(1),
(2) Date: Jan. 6, 2020

(87) PCT Pub. No.: WO2019/082348
PCT Pub. Date: May 2, 2019

(65) Prior Publication Data
US 2020/0216288 A1 Jul. 9, 2020

(51) Int. Cl.
*H01Q 3/26* (2006.01)
*H04W 4/33* (2018.01)
(Continued)

(52) U.S. Cl.
CPC ............ *H01Q 3/2605* (2013.01); *H04W 4/33* (2018.02); *H04W 36/30* (2013.01); *H04W 48/18* (2013.01); *H04W 76/16* (2018.02); *H04W 88/06* (2013.01)

(58) Field of Classification Search
CPC ... B66B 5/0006; H01Q 3/2605; H04M 11/00; H04Q 9/00; H04W 24/08; H04W 36/30;
(Continued)

(56) References Cited

U.S. PATENT DOCUMENTS

2004/0157610 A1* 8/2004 Black .................... H04W 36/30
455/454
2006/0246887 A1* 11/2006 Barclay ................ H04B 17/391
455/67.11
(Continued)

FOREIGN PATENT DOCUMENTS

JP  2006-319520 A  11/2006
JP  2009-177441 A   8/2009
(Continued)

OTHER PUBLICATIONS

Office Action issued Jul. 7, 2021 in Indian Application No. 202047014981.
(Continued)

*Primary Examiner* — Nguyen T Vo
(74) *Attorney, Agent, or Firm* — XSENSUS LLP

(57) ABSTRACT

A monitoring device (120) is provided at a building (100) in which an elevator (110) is provided and communicates with a center via an IP network (401). The monitoring device (120) includes a communication unit (143) and a selecting unit (133). The communication unit (143) can perform wireless communication in a plurality of communication modes. The selecting unit (133) selects a connection mode on the basis of a first evaluation value and a second evaluation value. The communication unit (143) transmits voice data and state data indicating a state of the elevator (110) to the center in the connection mode.

10 Claims, 11 Drawing Sheets

(51) Int. Cl.
   *H04W 36/30*      (2009.01)
   *H04W 48/18*      (2009.01)
   *H04W 76/16*      (2018.01)
   *H04W 88/06*      (2009.01)

(58) Field of Classification Search
   CPC ....... H04W 4/33; H04W 48/18; H04W 76/16; H04W 88/06
   See application file for complete search history.

(56) References Cited

U.S. PATENT DOCUMENTS

| | | | |
|---|---|---|---|
| 2007/0037602 A1 | 2/2007 | Shimizu et al. | |
| 2021/0198080 A1* | 7/2021 | Lewis | B66B 5/0006 |

FOREIGN PATENT DOCUMENTS

| | | |
|---|---|---|
| JP | 2010-278973 A | 12/2010 |
| JP | 2016-037388 A | 3/2016 |
| WO | 2017/158683 A1 | 9/2017 |

OTHER PUBLICATIONS

International Search Report and Written Opinion mailed on Jan. 23, 2018 for PCT/JP2017/038764 filed on Oct. 26, 2017, 9 pages including English Translation of the International Search Report.

* cited by examiner

130: MONITORING CONTROLLER
131: DATA COLLECTING UNIT
132: INTERCOM CONTROL UNIT
133: SELECTING UNIT
134: PRIORITY SETTING UNIT
135: SPECIFYING UNIT
136: CORRECTING UNIT
137: STORAGE UNIT

140: COMMUNICATION DEVICE
141: MEASURING UNIT
142: MEASURING UNIT
143: COMMUNICATION UNIT

120: MONITORING DEVICE

S101: MEASURE RADIO FIELD STRENGTH
S102: CREATE FIRST PRIORITY LIST
S103: STORE FIRST PRIORITY LIST
S104: ARE FIRST MEASUREMENT CONDITIONS SATISFIED?
S105: MEASURE RADIO FIELD STRENGTH
S106: UPDATE FIRST PRIORITY LIST

S201: MEASURE COMMUNICATION QUALITY
S202: CREATE SECOND PRIORITY LIST
S203: STORE SECOND PRIORITY LIST
S204: ARE SECOND MEASUREMENT CONDITIONS SATISFIED?
S205: MEASURE COMMUNICATION QUALITY
S206: UPDATE SECOND PRIORITY LIST

S301: TRANSMIT DATA?
S302: SELECT CONNECTION MODE
S303: TRANSMIT DATA IN SELECTED CONNECTION MODE

S401: IS SECOND PRIORITY LIST STORED?
S402: SELECT CONNECTION MODE ON THE BASIS OF FIRST PRIORITY LIST
S403: SELECT CONNECTION MODE ON THE BASIS OF SECOND PRIORITY LIST

S501: IS SECOND PRIORITY LIST STORED?
S502: EXCLUDE CONNECTION PROHIBITION MODE
S503: SELECT CONNECTION MODE ON THE BASIS OF FIRST PRIORITY LIST
S504: EXCLUDE CONNECTION PROHIBITION MODE
S505: SELECT CONNECTION MODE ON THE BASIS OF SECOND PRIORITY LIST

S601: ABNORMAL DISCONNECTION OF COMMUNICATION?
S602: DOES NUMBER OF TIMES OF ABNORMAL DISCONNECTION
      IN COMMUNICATION MODE EXCEED REFERENCE NUMBER?
S603: SPECIFY COMMUNICATION MODE AS CONNECTION PROHIBITION MODE
S604: STORE INFORMATION OF CONNECTION PROHIBITION MODE

S701: WIRELESS COMMUNICATION WITH BASE STATION LOCATED IN ANOTHER COUNTRY?
S702: SPECIFY COMMUNICATION MODE AS CONNECTION PROHIBITION MODE
S703: STORE INFORMATION OF CONNECTION PROHIBITION MODE

S801: IS VOICE DATA INCLUDED?
S802: EXCLUDE CONNECTION PROHIBITION MODE
S803: IS SECOND PRIORITY LIST STORED?
S804: SELECT CONNECTION MODE ON THE BASIS OF FIRST PRIORITY LIST
S805: SELECT CONNECTION MODE ON THE BASIS OF SECOND PRIORITY LIST

S901: IS SECOND PRIORITY LIST STORED?
S902: IS VOICE DATA INCLUDED?
S903: CORRECT FIRST PRIORITY LIST
S904: SELECT CONNECTION MODE ON THE BASIS OF FIRST PRIORITY LIST
S905: IS VOICE DATA INCLUDED?
S906: CORRECT SECOND PRIORITY LIST
S907: SELECT CONNECTION MODE ON THE BASIS OF SECOND PRIORITY LIST

MONITORING DEVICE AND MONITORING SYSTEM

CROSS-REFERENCE TO RELATED APPLICATIONS

The present application is based on PCT filing PCT/JP2017/038764, filed Oct. 26, 2017, the entire contents of which are incorporated herein by reference.

FIELD

The present invention relates to a monitoring device and a monitoring system for monitoring an elevator.

BACKGROUND

PTL 1 discloses a system for monitoring an elevator. The system disclosed in PTL 1 includes a monitoring device which communicates with a center. The monitoring device can perform communication both in a 3G (3rd Generation) communication mode and an LTE (Long Term Evolution) communication mode. In the system disclosed in PTL 1, communication is performed in a communication mode in which radio field strength is higher.

CITATION LIST

Patent Literature

[PTL 1] JP 2016-37388 A

SUMMARY

Technical Problem

In the system disclosed in PTL 1, data regarding operation of an elevator is transmitted to a center, for example, once a month. While this communication is performed in a communication mode in which radio field strength is high, it is not necessarily possible to realize stable communication in the communication mode in which the radio field strength is high. There is a case where stable communication cannot be performed in the system disclosed in PTL 1.

The present invention is made to solve the problem as described above. An object of the present invention is to provide a monitoring device which is capable of performing communication more stably. Another object of the present invention is to provide a monitoring system which is capable of performing communication more stably.

Solution to Problem

A monitoring device of the present invention is provided at a building in which an elevator is provided and communicates with a center via an IP network. The monitoring device comprises communication means being able to perform wireless communication in a plurality of communication modes, and selection means for selecting a connection mode to be used by the communication means to perform wireless communication from among the plurality of communication modes on the basis of a first evaluation value indicating strength of a radio wave received by the communication means and a second evaluation value indicating communication quality between the communication means and the center. The communication means transmits voice data and state data indicating a state of the elevator to the center in the connection mode.

A monitoring device of the present invention is provided at a building in which an elevator is provided and communicates with a center via an IP network. The monitoring device comprises communication means being able to perform wireless communication with a plurality of base stations, and selection means for selecting a connection base station with which the communication means performs wireless communication from among the plurality of base stations on the basis of a first evaluation value indicating strength of a radio wave received by the communication means from the plurality of base stations and a second evaluation value indicating communication quality between the communication means and the center. The plurality of base stations include a base station of a first telecommunications carrier and a base station of a second telecommunications carrier different from the first telecommunications carrier. The communication means transmits voice data and state data indicating a state of the elevator to the center via the connection base station.

A monitoring device of the present invention is provided at a building in which an elevator is provided and communicates with a center via an IP network. The monitoring device comprises communication means being able to perform wireless communication in a plurality of communication modes, priority setting means for setting priority for each of the plurality of communication modes on the basis of a first evaluation value indicating strength of a radio wave received by the communication means, storage means for storing information on a connection prohibition mode, and selection means for selecting a communication mode for which the priority set by the priority setting means is the highest among the plurality of communication modes except the connection prohibition mode, as a connection mode to be used by the communication means to perform wireless communication. The communication means transmits voice data and state data indicating a state of the elevator to the center in the connection mode.

A monitoring device of the present invention is provided at a building in which an elevator is provided and communicates with a center via an IP network. The monitoring device comprises communication means being able to perform wireless communication in a plurality of communication modes, priority setting means for setting priority for each of the plurality of communication modes on the basis of a first evaluation value indicating strength of a radio wave received by the communication means, correction means for correcting the priority set by the priority setting means on the basis of types of data to be transmitted by the communication means, and selection means for selecting a communication mode for which the priority corrected by the correction means is the highest among the plurality of communication modes, as a connection mode to be used by the communication means to perform wireless communication. The communication means transmits voice data and state data indicating a state of the elevator to the center in the connection mode.

A monitoring system of the present invention comprises a car of an elevator which moves in a shaft formed at a building, a controller configured to control operation of the car, an intercom provided in the car, and a monitoring device provided at the building and configured to communicate with a center via an IP network. The monitoring device comprises data collection means for collecting state data from the controller, communication means being able to perform wireless communication in a plurality of communication modes, and selection means for selecting a connection mode to be used by the communication means to perform wireless communication from among the plurality of communication modes on the basis of a first evaluation value indicating strength of a radio wave received by the communication means and a second evaluation value indicating communication quality between the communication means and the center. The communication means transmits the state data collected by the data collection means and voice data from the intercom to the center in the connection mode.

Advantageous Effects of Invention

For example, a monitoring device according to the present invention includes communication means and selection means. The communication means can perform wireless communication in a plurality of communication modes. The selection means selects a connection mode to be used by the communication means to perform wireless communication from among a plurality of communication modes on the basis of a first evaluation value indicating strength of a radio wave received by the communication means and a second evaluation value indicating communication quality between the communication means and a center. According to the present invention, it is possible to perform more stable communication.

DESCRIPTION OF EMBODIMENTS

Figure 1:
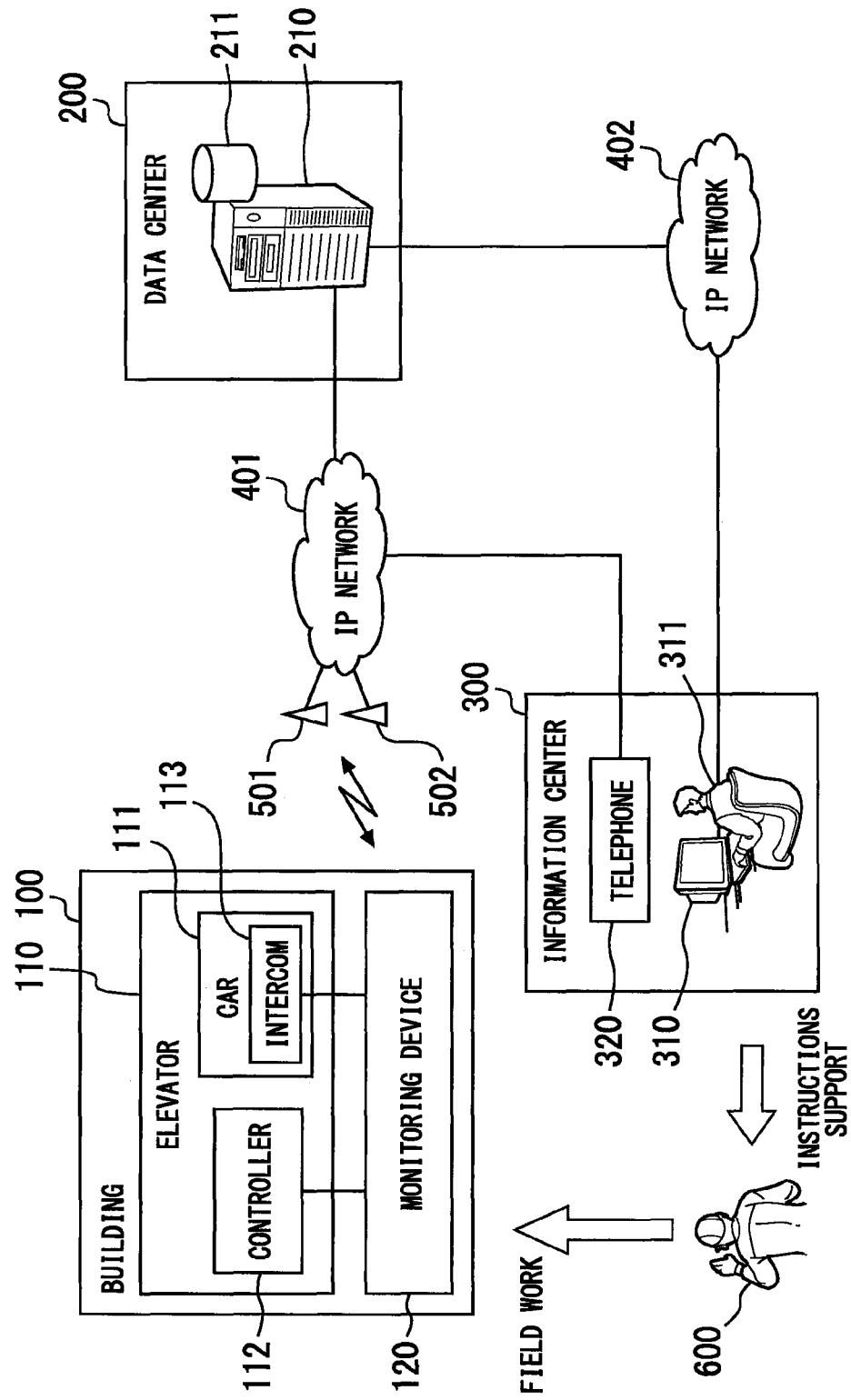
FIG. 1 is a view illustrating an example of a monitoring system in Embodiment 1.

The present invention will be described with reference to the accompanying drawings. Redundant descriptions will be simplified or omitted as appropriate. In each of the drawings, the same reference numerals indicate the same or corresponding parts.

Embodiment 1

FIG. 1 is a view illustrating an example of a monitoring system in Embodiment 1. As illustrated in FIG. 1, the monitoring system includes, for example, an elevator 110, a monitoring device 120, a server 210, a monitoring terminal 310 and a telephone 320. The elevator 110 and the monitoring device 120 are provided at a building 100. The server 210 is provided at a data center 200. The monitoring terminal 310 and the telephone 320 are provided at an information center 300.

The monitoring device 120 communicates with the remote data center 200 via an IP network 401. For example, the monitoring device 120 is connected to the server 210 via the IP network 401. The monitoring device 120 communicates with the remote information center 300 via the IP network 401. For example, the monitoring device 120 is connected to the telephone 320 via the IP network 401. The monitoring terminal 310 communicates with the remote data center 200 via an IP network 402. For example, the monitoring terminal 310 is connected to the server 210 via the IP network 402.

In the present embodiment, the IP network is a communication network using IP (Internet Protocol) as a communication protocol. For example, the IP network 401 is a closed network. The IP network 402 is a closed network. In place of the IP networks 401 and 402, an open network may be used.

The data center 200 communicates with a number of elevators. The elevator 110 is an example of the elevators which communicate with the data center 200. For example, a database 211 is included in the server 210. Data transmitted from the monitoring device 120 at the building 100 is accumulated in the database 211. For example, data indicating a state of the elevator 110 is accumulated in the database 211. Furthermore, the server 210 gives necessary instructions to the building 100.

Data transmitted from the monitoring terminal 310 at the information center 300 is accumulated in the database 211. For example, data indicating processing details performed on past failures of the elevator 110 and results of the processing being performed is accumulated in the database 211. Furthermore, the server 210 provides data accumulated in the database 211 in response to a request from the information center 300.

The information center 300 communicates with a number of elevators. The elevator 110 is an example of the elevators which communicate with the information center 300. Maintenance support for the elevator 110 and restoration support for the elevator 110 are performed by an operator 311 at the information center 300. For example, a worker 600 heads to the building 100 in response to instructions from the operator 311 who operates the monitoring terminal 310. The worker 600 then performs field work such as maintenance or restoration of the elevator 110 while receiving provision of data from the operator 311.

FIG. 1 illustrates an example where the data center 200 is located remotely from the information center 300. The server 210, the monitoring terminal 310 and the telephone 320 may be provided at one center. In this case, the center has a function as the data center 200 and a function as the information center 300.

In a case where the data center 200 is located remotely from the information center 300, the information center 300 is preferably located in a country in which the building 100 is located. Meanwhile, the data center 200 does not have to be located in a country in which the building 100 is located. The data center 200 may be located in a country in which the building 100 is located or may be located in a country different from the country in which the building 100 is located. For example, data from elevators located in some countries may be accumulated in the database 211 located in Japan.

FIG. 1 illustrates an example where one elevator is provided at the building 100. A plurality of elevators may be provided at the building 100. The elevator 110 includes, for example, a car 111, a controller 112 and an intercom 113. The car 111 vertically moves in a shaft (not illustrated) formed in the building 100. Operation of the car 111 is controlled by the controller 112. The intercom 113 is provided in the car 111. The intercom 113 is a device for allowing a person inside the car 111 to talk with the operator 311 at the information center 300.

Figure 2:
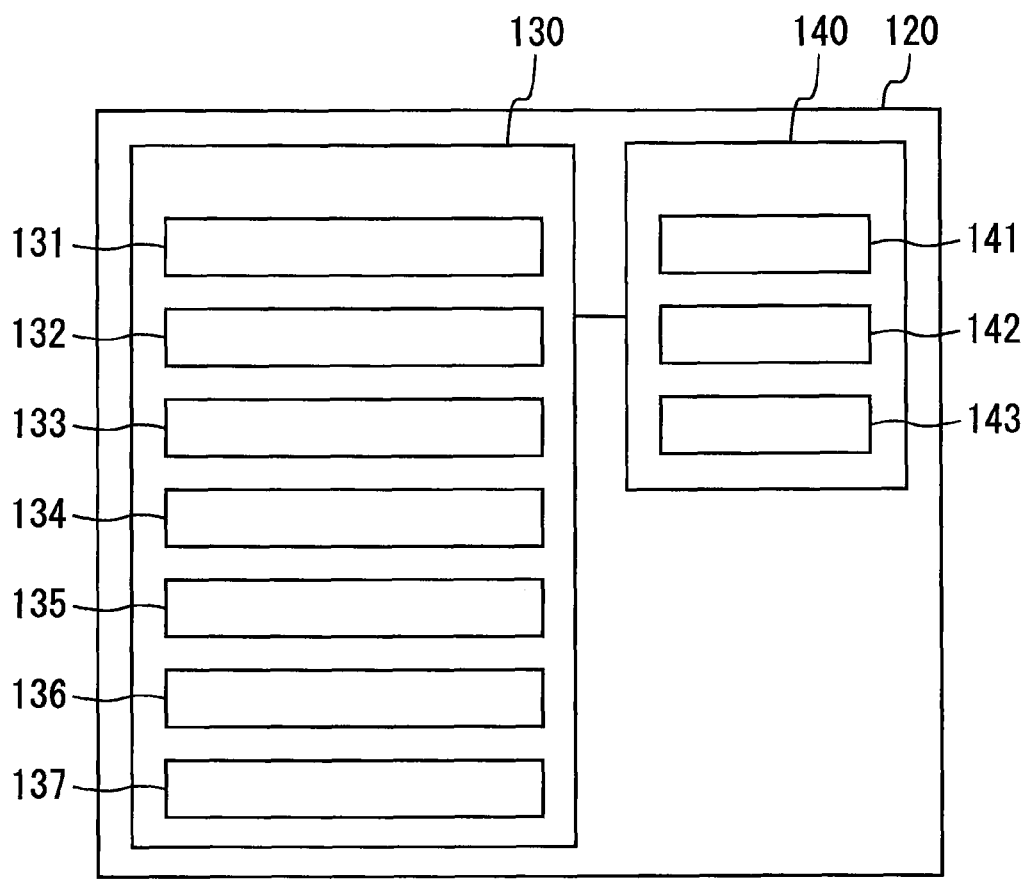
FIG. 2 is a view illustrating an example of a monitoring device.

FIG. 2 is a view illustrating an example of the monitoring device 120. The monitoring device 120 includes, for example, a monitoring controller 130 and a communication device 140. The monitoring controller 130 includes, for example, a data collecting unit 131, an intercom control unit 132, a selecting unit 133, a priority setting unit 134, a specifying unit 135, a correcting unit 136 and a storage unit 137. The communication device 140 includes, for example, a measuring unit 141, a measuring unit 142 and a communication unit 143.

The data collecting unit 131 collects data indicating a state of the elevator 110. In the following description, the data indicating the state of the elevator 110 will be also referred to as "state data". For example, the state data includes data indicating an operation state of the elevator 110. Examples of the operation state of the elevator 110 can include a position of the car 111, moving speed of the car 111, a moving direction of the car 111, opening and closing of a door, call registration, or the like. As another example, the state data includes data indicating a failed state of the elevator 110.

The data collecting unit 131 collects the state data from, for example, the controller 112. The state data collected by the data collecting unit 131 is basically digital data. If the state data input from the controller 112 to the data collecting unit 131 is analog data, the data collecting unit 131 converts the analog data into digital data. All or part of the state data collected by the data collecting unit 131 is accumulated in the storage unit 137 for a certain period.

The intercom control unit 132 controls the intercom 113. Data indicating voice input to the intercom 113 is input to the intercom control unit 132. In the following description, the data indicating voice will be also referred to as "voice data". If the voice data input from the intercom 113 to the intercom control unit 132 is analog data, the intercom control unit 132 converts the analog data into digital data. The voice data input from the intercom 113 to the intercom control unit 132 may be digital data.

The communication unit 143 communicates with the data center 200 and the information center 300 via the IP network 401. That is, the communication device 140 is a communication interface on the building 100 side. The communication unit 143 can perform wireless communication in a plurality of communication modes. For example, the building 100 is located within a range where a radio wave from a base station 501 of a telecommunications carrier A reaches. Also, the building 100 is located within a range where a radio wave from a base station 502 of a telecommunications carrier B reaches. The telecommunications carrier B is a telecommunications carrier different from the telecommunications carrier A. Table 1 indicates an example of communication modes in which the communication unit 143 can perform wireless communication.

TABLE 1

| Telecommunications carrier | A | B |
|---|---|---|
| Communication mode | 2G | 2G |
| | 3G | 3G |
| | 4G | 4G |

Table 1 indicates an example where the communication unit 143 can perform wireless communication in six types of communication modes. In the present embodiment, even if communication modes are communication modes of the same telecommunications carrier, the communication modes complying with different standards are different communication modes. For example, 2G (2nd Generation) and 4G (4th Generation) of the telecommunications carrier A are different communication modes. Furthermore, even if communication modes comply with the same standards, the communication modes of different telecommunications carriers are different communication modes. For example, 4G of the telecommunications carrier A and 4G of the telecommunications carrier B are different communication modes.

FIG. 1 illustrates an example where the communication unit 143 can perform wireless communication with base stations of a plurality of telecommunications carriers. Also, Table 1 indicates an example where the communication unit 143 can perform wireless communication in communication modes of a plurality of telecommunications carriers. The communication unit 143 is preferably able to perform wireless communication in communication modes of a plurality of telecommunications carriers. However, the communication unit 143 may be able to perform wireless communication in a plurality of communication modes of only a single telecommunications carrier.

The selecting unit 133 selects a communication mode to be used by the communication unit 143 to perform wireless communication. In the following description, a communication mode to be used by the communication unit 143 to perform wireless communication will be also referred to as a "connection mode". The selecting unit 133 selects a connection mode from among a plurality of communication modes in which the communication unit 143 can perform wireless communication.

The selecting unit 133 selects one communication mode as the connection mode on the basis of, for example, a first evaluation value and a second evaluation value. The first evaluation value is a value indicating strength of a radio wave received by the communication unit 143. For example, the first evaluation value becomes a greater value as the strength of the radio wave received by the communication unit 143 is higher. The first evaluation value may become a smaller value as the strength of the radio wave received by the communication unit 143 is higher.

The measuring unit 141 measures the strength of the radio wave received by the communication unit 143. Examples of a value measured by the measuring unit 141 as the radio field strength can include a received signal strength indicator (RSSI), received power density, received power-to-input power density ratio (Eb/Io), received power-to-noise power density ratio (Eb/No), received power-to-disturbance power density ratio (Ec/Io), and a received information error rate (FER: Fleme Error Rate). The measuring unit 141 may measure one of these values or may measure a plurality of these values. The measuring unit 141 may measure another value as the radio field strength. The first evaluation value is a value measured by the measuring unit 141 or a value obtained from the measured value.

The second evaluation value is a value indicating communication quality between the communication unit 143 and a specific transmission destination to which data is to be actually transmitted. For example, the second evaluation value becomes a greater value as communication quality between the communication unit 143 and the transmission destination is more favorable. The second evaluation value may become a smaller value as the communication quality between the communication unit 143 and the transmission destination is more favorable.

The measuring unit 142 measures communication quality between the communication unit 143 and a specific data transmission destination. Examples of a value measured by the measuring unit 142 as quality of a communication path between the communication unit 143 and the specific data transmission destination can include the number of times of occurrence of a packet loss, an occurrence rate of a packet loss, a packet fluctuation period, and a packet delay period. The measuring unit 142 may measure one of these values, or may measure a plurality of these values. The measuring unit 142 may measure another value as quality of the communication path. The second evaluation value is a value measured by the measuring unit 142 or a value obtained by the measured value.

Various functions of the monitoring device 120 will be described below also with reference to FIG. 3 to FIG. 11. It is assumed in the following respective examples that the communication unit 143 can perform wireless communication in six communication modes indicated in Table 1.

Figure 3:
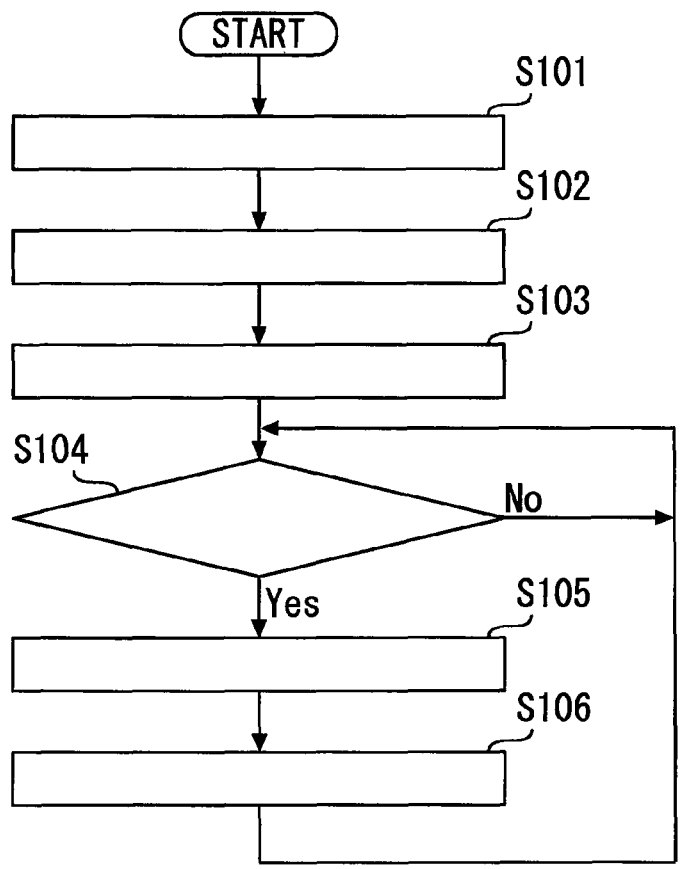
FIG. 3 is a flowchart illustrating an operation example of the monitoring device.

FIG. 3 is a flowchart illustrating an operation example of the monitoring device 120. As illustrated in FIG. 2, the monitoring controller 130 includes the priority setting unit 134. The priority setting unit 134 sets priority to each of a plurality of communication modes in which the communication unit 143 can perform wireless communication. In an example described in the present embodiment, the priority setting unit 134 creates a priority list by arranging the six communication modes indicated in Table 1 in descending order of the priority.

When the elevator 110 is installed at the building 100, the strength of the radio wave received by the communication unit 143 is measured by the measuring unit 141 (S101). By this means, the first evaluation value is obtained for each communication mode. For example, the measuring unit 141 measures the radio field strength of 2G of the telecommunications carrier A. By this means, the first evaluation value for 2G of the telecommunications carrier A is obtained. The measuring unit 141 measures the radio field strength of 3G of the telecommunications carrier A. By this means, the first evaluation value for 3G of the telecommunications carrier A is obtained. In a similar manner, the measuring unit 141 measures the radio field strength of 4G of the telecommunications carrier B. By this means, the first evaluation value for 4G of the telecommunications carrier B is obtained.

The priority setting unit 134 sets priority for each of six communication modes indicated in Table 1 on the basis of the first evaluation value obtained in S101. For example, the priority setting unit 134 creates a first priority list so that the priority becomes higher for a communication mode in which the radio field strength measured by the measuring unit 141 is higher (S102). The first priority list created by the priority setting unit 134 is stored in the storage unit 137 (S103). Table 2 indicates an example of the first priority list stored in the storage unit 137 in S103.

TABLE 2

| Priority | Communication mode |
| --- | --- |
| 1 | Telecommunications carrier A: 4G |
| 2 | Telecommunications carrier B: 4G |
| 3 | Telecommunications carrier B: 3G |
| 4 | Telecommunications carrier A: 3G |
| 5 | Telecommunications carrier B: 2G |
| 6 | Telecommunications carrier A: 2G |

When the first priority list is stored in the storage unit 137 in S103, it is determined whether or not first measurement conditions are satisfied (S104). The first measurement conditions are conditions for the measuring unit 141 to start measurement of the radio field strength. The first measurement conditions are set in advance. For example, if a certain period has elapsed since the radio field strength had been measured last time, the first measurement conditions are satisfied.

When the first measurement conditions are satisfied, the measuring unit 141 measures the strength of the radio wave received by the communication unit 143 again (S105). By this means, the latest first evaluation value is obtained for each communication mode. The priority setting unit 134 resets priority for each of the six communication modes indicated in Table 1 on the basis of the first evaluation value obtained in S105. The priority setting unit 134 may reset the priority on the basis of both the latest first evaluation value and the past first evaluation value. The priority setting unit 134 updates the first priority list on the basis of the reset priority (S106). By this means, the first priority list in which the latest first evaluation value is reflected is stored in the storage unit 137.

Figure 4:
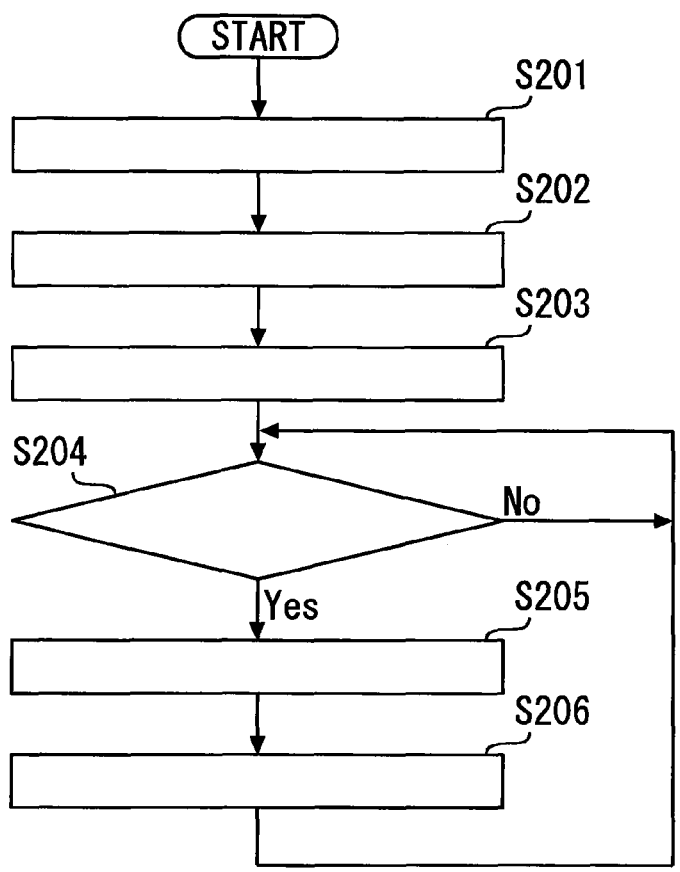
FIG. 4 is a flowchart illustrating another operation example of the monitoring device.

FIG. 4 is a flowchart illustrating another operation example of the monitoring device 120.

When data is transmitted from the communication unit 143 to the data center 200, communication quality between the communication unit 143 and the data center 200 is measured by the measuring unit 142 (S201). By this means, the second evaluation value is obtained for each communication mode. For example, the measuring unit 142 measures communication quality of 2G of the telecommunications carrier A by performing communication in 2G of the telecommunications carrier A. By this means, the second evaluation value for 2G of the telecommunications carrier A is obtained. The measuring unit 142 measures communication quality of 3G of the telecommunications carrier A by performing communication in 3G of the telecommunications carrier A. By this means, the second evaluation value for 3G of the telecommunications carrier A is obtained. In a similar manner, the measuring unit 142 measures communication quality of 4G of the telecommunications carrier B by performing communication in 4G of the telecommunications carrier B. By this means, the second evaluation value for 4G of the telecommunications carrier B is obtained.

In the present monitoring system, for example, alive monitoring for the monitoring device 120 is performed at the data center 200. In this alive monitoring, data indicating that the monitoring device 120 normally functions is transmitted to the data center 200 from the communication unit 143. The measuring unit 142 may measure quality of a communication path in each communication mode when communication is performed for this alive monitoring.

Immediately after the elevator 110 is installed at the building 100, a second priority list which will be described later is not stored in the storage unit 137. In such a case, the priority setting unit 134 sets priority for each of the six communication modes indicated in Table 1 on the basis of the first evaluation value and the second evaluation value obtained in S201. How the priority is determined on the basis of the first evaluation value and the second evaluation value is set in advance. For example, the priority setting unit 134 creates the second priority list by correcting the first priority list stored in the storage unit 137 using the second evaluation value obtained in S201 (S202). The second priority list created by the priority setting unit 134 is stored in the storage unit 137 (S203). Table 3 indicates an example of the second priority list stored in the storage unit 137 in S203.

TABLE 3

| Priority | Communication mode |
|---|---|
| 1 | Telecommunications carrier B: 4G |
| 2 | Telecommunications carrier A: 4G |
| 3 | Telecommunications carrier B: 3G |
| 4 | Telecommunications carrier B: 2G |
| 5 | Telecommunications carrier A: 3G |
| 6 | Telecommunications carrier A: 2G |

When the second priority list is stored in the storage unit 137 in S203, it is determined whether or not second measurement conditions are satisfied (S204). The second measurement conditions are conditions for the measuring unit 142 to start measurement of communication quality. The second measurement conditions are set in advance. For example, the second measurement conditions may be the same as conditions for starting communication for the alive monitoring.

When the second measurement conditions are satisfied, the measuring unit 142 measures communication quality between the communication unit 143 and the data center 200 again (S205). By this means, the latest second evaluation value is obtained for each communication mode. The priority setting unit 134 resets priority for each of the six communication modes indicated in Table 1 on the basis of the first evaluation value and the second evaluation value obtained in S205. The priority setting unit 134 may reset the priority using both the latest value and the past value for the first evaluation value. The priority setting unit 134 may reset the priority using both the latest value and the past value for the second evaluation value. The priority setting unit 134 updates the second priority list on the basis of the reset priority (S206). By this means, the second priority list in which the latest second evaluation value is reflected is stored in the storage unit 137.

Figure 5:
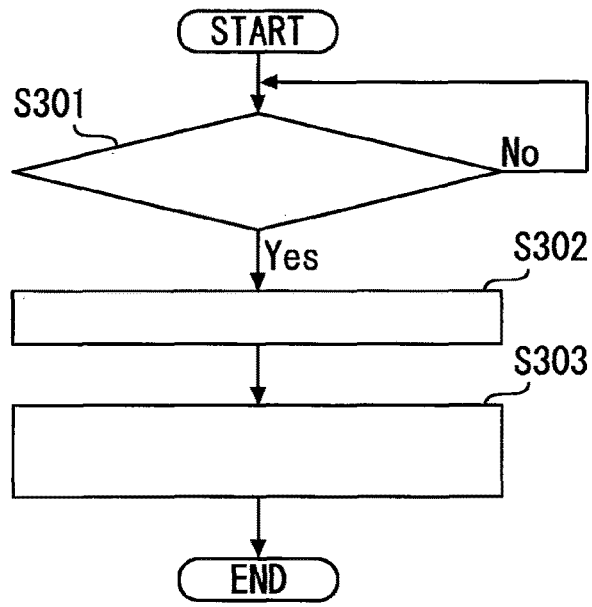
FIG. 5 is a flowchart illustrating another operation example of the monitoring device.

FIG. 5 is a flowchart illustrating another operation example of the monitoring device 120.

It is determined in the monitoring device 120 whether or not it is necessary to transmit data to outside (S301). For example, the state data collected by the data collecting unit 131 is regularly transmitted to the data center 200. When voice data is input from the intercom 113 to the intercom control unit 132, the voice data is immediately transmitted to the information center 300.

Figure 6:
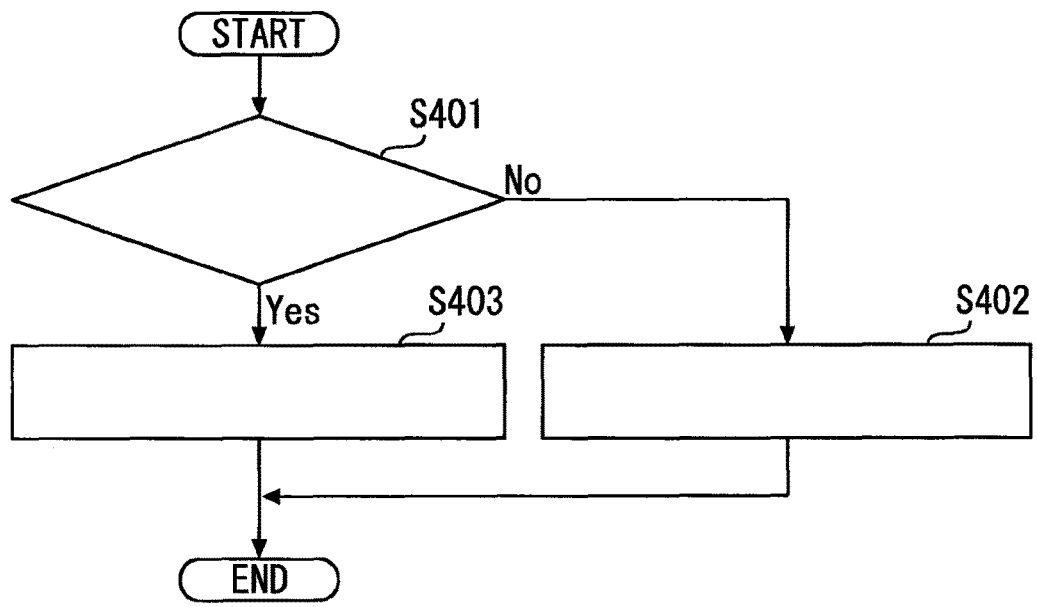
FIG. 6 is a flowchart illustrating a selection example of a connection mode.

When it is necessary to transmit data to outside, the selecting unit 133 selects one communication mode from the six communication modes indicated in Table 1 as the connection mode (S302). FIG. 6 is a flowchart illustrating a selection example of the connection mode. FIG. 6 illustrates processing details to be performed in S302.

The selecting unit 133 determines whether or not the second priority list is stored in the storage unit 137 (S401). For example, immediately after the elevator 110 is installed at the building 100, the second priority list is not stored in the storage unit 137. In this case, the selecting unit 133 selects the connection mode on the basis of the first priority list stored in the storage unit 137 (S402). For example, the selecting unit 133 selects a communication mode listed on the top in the first priority list as the connection mode. By this means, a communication mode for which the priority set by the priority setting unit 134 is the highest at that time point is selected as the connection mode.

When the second priority list is stored in the storage unit 137, the selecting unit 133 selects the connection mode on the basis of the stored second priority list (S403). For example, the selecting unit 133 selects a communication mode listed on the top in the second priority list as the connection mode. By this means, a communication mode for which priority in which both the first evaluation value and the second evaluation value are reflected is the highest at that time point is selected as the connection mode.

The communication unit 143 transmits data to outside of the building 100 in the communication mode selected in S302, that is, in the connection mode (S303). For example, the communication unit 143 transmits the state data collected by the data collecting unit 131 to the data center 200 in the connection mode. The state data transmitted in S303 is received at the server 210 via the IP network 401. Furthermore, the communication unit 143 transmits the voice data from the intercom 113 input to the intercom control unit 132 to the information center 300 in the connection mode. The voice data transmitted in S303 is received at the telephone 320 via the IP network 401. Note that, in a case where communication is disconnected by a temporal failure after data is transmitted in S303, the communication unit 143 may transmit the data while switching the communication mode to a communication mode for which priority is the second highest.

Note that, in a case where quality of the communication path is measured upon alive monitoring, processing illustrated in FIG. 5 is not performed upon alive monitoring. Data is transmitted in each communication mode to measure communication quality in each communication mode. Furthermore, in a case where one center has a function as the data center 200 and a function as the information center 300, the communication unit 143 transmits the state data collected by the data collecting unit 131 to the center in the connection mode. The communication unit 143 transmits the voice data from the intercom 113 input to the intercom control unit 132 to the center in the connection mode. In such a case, the second evaluation value is, for example, a value indicating communication quality between the communication unit 143 and the center.

In the above-described example, the connection mode is selected on the basis of the first evaluation value and the second evaluation value. Then, data is transmitted by the communication unit 143 in the selected connection mode. Because the connection mode is selected also on the basis of the second evaluation value indicating the quality of the communication path, according to the present monitoring system, it is possible to perform more stable communication.

For example, in the present monitoring system, the voice data is transmitted from the communication unit 143. If fluctuation, or the like, occurs when communication of the voice data is performed, conversation between a person inside the car 111 and the operator 311 cannot be established. A person inside the car 111 requires talking with the operator 311 mostly at time of emergency such as in a case where the person is locked in. According to the present monitoring system, it is possible to establish stable communication even at time of such emergency. Therefore, it is possible to prevent the person inside the car 111 from feeling anxious or from being thrown into a panic.

Figure 7:
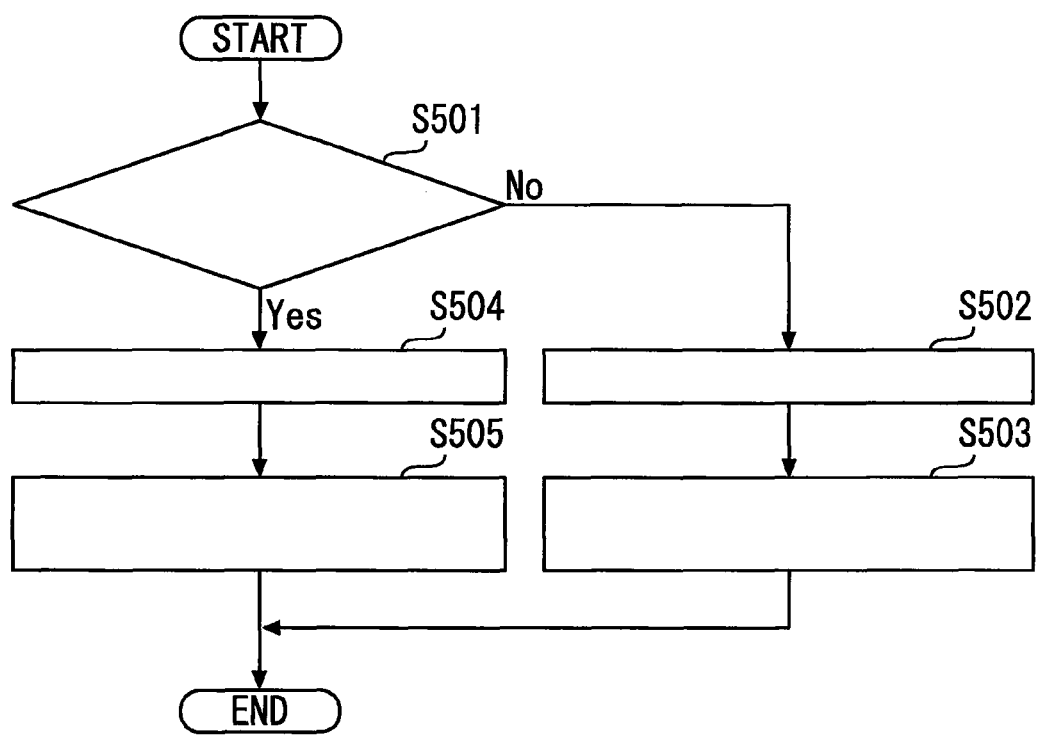
FIG. 7 is a flowchart illustrating another selection example of the connection mode.

FIG. 7 is a flowchart illustrating another selection example of the connection mode. FIG. 7 illustrates processing details to be performed in S302. In the example illustrated in FIG. 7, information on a connection prohibition mode is stored in the storage unit 137. The connection prohibition mode is a communication mode in which the communication unit 143 is prohibited from performing wireless communication.

For example, when communication is performed in a specific communication mode of a certain telecommunications carrier, there is a case where abnormal disconnection of communication may occur. As an example, if the monitoring device 120 is provided at an intermediate point between two base stations of the telecommunications carrier A, processing of switching the base station is frequently performed at the telecommunications carrier A. In such a case, there is a case where communication is forcibly disconnected by determination by the telecommunications carrier A. As another example, if communication is performed in a specific communication mode of the telecommunications carrier A, there is a case where communication is forcibly disconnected after several minutes have elapsed since communication had been started by circumstances on the telecommunications carrier A side which cannot be involved from the monitoring device 120 side. As another example, if a time-out occurs, the communication unit 143 forcibly disconnects communication. There is also a case where the communication unit 143 forcibly disconnects communication by other factors. Information of the communication mode in which such abnormal disconnection of communication frequently occurs may be stored in the storage unit 137 as information on the connection prohibition mode.

In the example illustrated in FIG. 7, the selecting unit 133 determines whether or not the second priority list is stored in the storage unit 137 (S501). When the second priority list is not stored in the storage unit 137, the selecting unit 133 selects the connection mode on the basis of the first priority list and the connection prohibition mode. For example, the selecting unit 133 excludes the connection prohibition mode from selection candidates for the connection mode (S502). The selecting unit 133 selects a communication mode listed on the top in the first priority list from the above-described six communication modes except the connection prohibition mode, as the connection mode (S503).

When the second priority list is stored in the storage unit 137, the selecting unit 133 selects the connection mode on the basis of the second priority list and the connection prohibition mode. For example, the selecting unit 133 excludes the connection prohibition mode from selection candidates for the connection mode (S504). The selecting unit 133 selects a communication mode listed on the top in the second priority list from the above-described six communication modes except the connection prohibition mode, as the connection mode (S505).

In the example illustrated in FIG. 7, the information on the connection prohibition mode is provided from, for example, the data center 200. In such a case, the monitoring device 120 stores the information on the connection prohibition mode received from the data center 200 in the storage unit 137. The worker 600 may manually store the information on the connection prohibition mode in the storage unit 137.

As another example, the monitoring device 120 may have a function of specifying the connection prohibition mode. In such a case, the specifying unit 135 is included in the monitoring controller 130. The specifying unit 135 specifies the connection prohibition mode. For example, specification conditions for specifying a certain communication mode as the connection prohibition mode are set in advance. When the specification conditions are satisfied for a certain communication mode, the specifying unit 135 specifies the certain communication mode as the connection prohibition mode. Information of the connection prohibition mode specified by the specifying unit 135 is stored in the storage unit 137.

Figure 8:
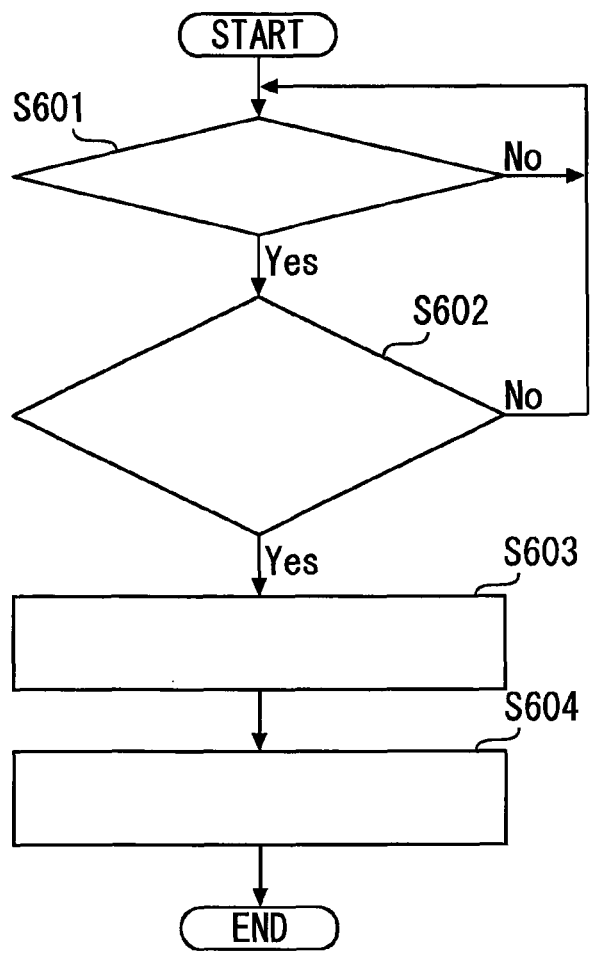
FIG. 8 is a flowchart illustrating an example where a connection prohibition mode is specified.

FIG. 8 is a flowchart illustrating an example where the connection prohibition mode is specified. FIG. 8 illustrates an example where the connection prohibition mode is specified in accordance with the number of times of occurrence of abnormal disconnection of communication.

The specifying unit 135 determines whether or not abnormal disconnection of communication occurs when communication is performed between the communication unit 143 and outside (S601). For example, if abnormal disconnection of communication occurs when communication is performed in a certain communication mode, the specifying unit 135 determines whether or not the number of times of occurrence of abnormal disconnection when communication is performed in the certain communication mode exceeds a reference number (S602). When the specifying unit 135 determines that the number of times of abnormal disconnection exceeds the reference number in S602, the specifying unit 135 specifies the certain communication mode as the connection prohibition mode (S603). Information of the connection prohibition mode specified in S603 is stored in the storage unit 137 (S604).

Figure 9:
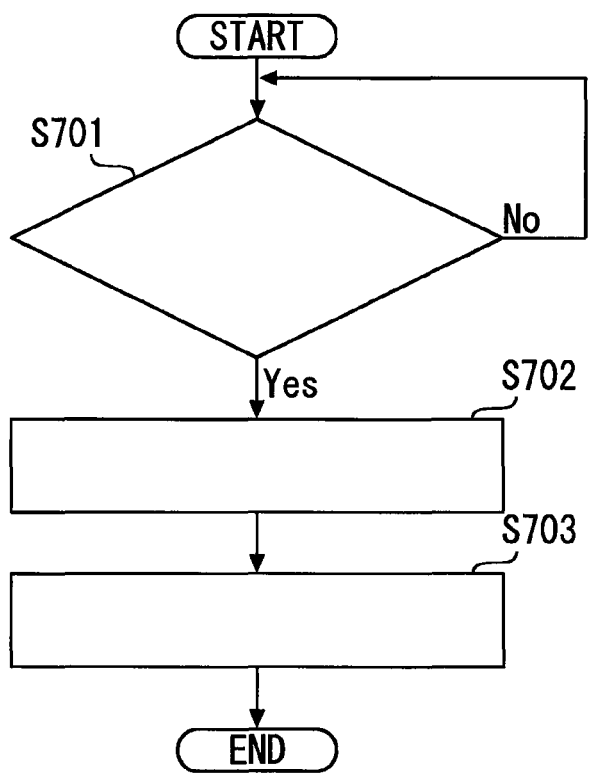
FIG. 9 is a flowchart illustrating another example where the connection prohibition mode is specified.

FIG. 9 is a flowchart illustrating another example where the connection prohibition mode is specified. FIG. 9 illustrates an example where the connection prohibition mode is specified in accordance with a location where a base station is located.

When the communication unit 143 performs communication in a certain communication mode, the specifying unit 135 determines whether or not the communication unit 143 has to perform wireless communication with a base station located in another country (S701). The specifying unit 135 specifies a communication mode in which the communication unit 143 has to perform wireless communication with a base station located in another country, as the connection prohibition mode (S702). Information of the connection prohibition mode specified in S702 is stored in the storage unit 137 (S703).

For example, a case where the building 100 is located in country C will be considered. It is assumed that the base station 501 is located in country C. It is assumed that the base station 502 is located in country D which is adjacent to country C. If the building 100 is built near a border with country D, there is a case where a radio wave from the base station 502 reaches the building 100. In such a case, the specifying unit 135 specifies the communication mode in which wireless communication with the base station 502 is performed, as the connection prohibition mode.

In this example, even if the communication unit 143 performs wireless communication with the base station 502, technical problems rarely occur. However, because data is transmitted to the data center 200, or the like, by way of a third country, there is a possibility that a contractual problem may occur with an owner of the building 100. In the example illustrated in FIG. 9, it is possible to specify the connection prohibition mode while taking into account a contractual problem with a customer as well as a technical problem.

Note that, in a case where information on the connection prohibition mode is provided from the data center 200, the data center 200 may have a function of specifying the connection prohibition mode. That is, the data center 200 has a function as the specifying unit 135. Furthermore, the data center 200 has a transmission function of transmitting the information on the connection prohibition mode specified by the specifying function to the monitoring device 120.

Figure 10:
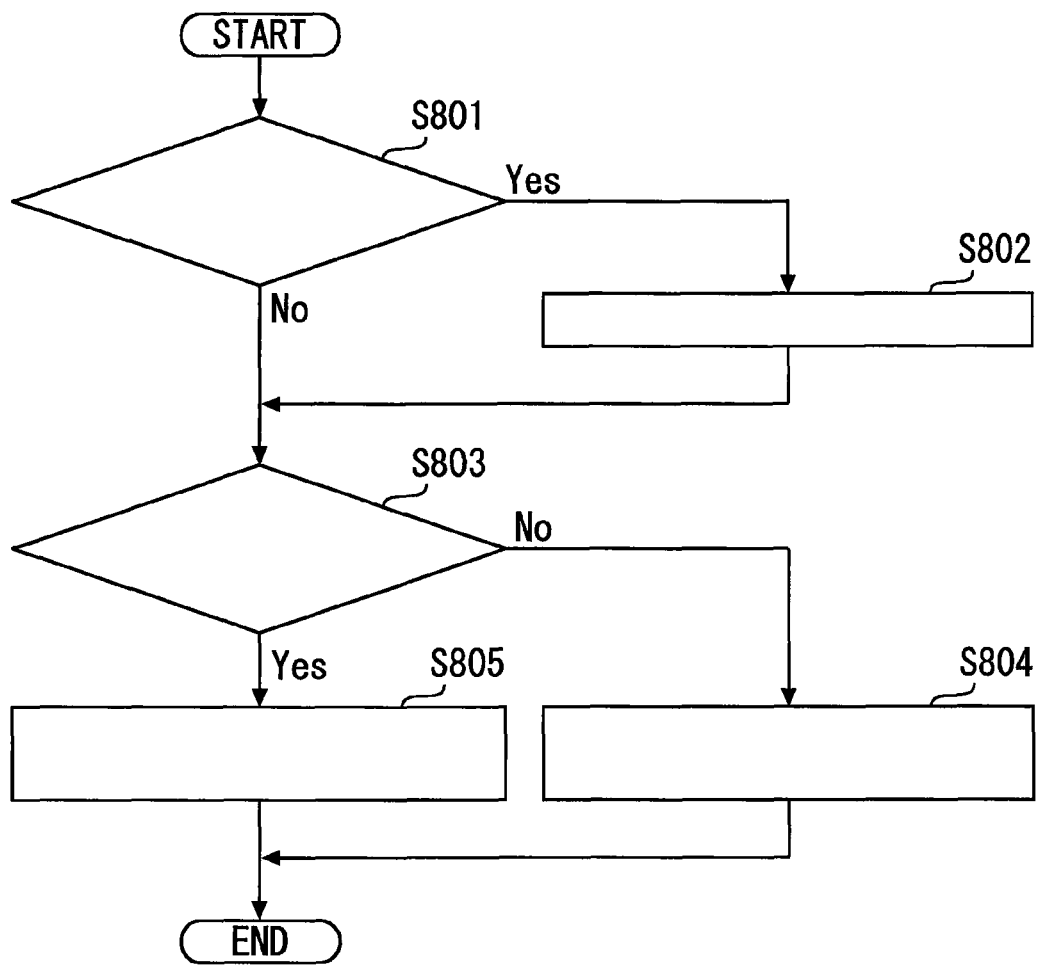
FIG. 10 is a flowchart illustrating another selection example of the connection mode.

FIG. 10 is a flowchart illustrating another selection example of the connection mode. FIG. 10 illustrates processing details to be performed in S302. In the example illustrated in FIG. 10, the information on the connection prohibition mode is stored in the storage unit 137. FIG. 10 illustrates an example where the connection prohibition mode is excluded from selection candidates for the connection mode in accordance with types of data to be transmitted by the communication unit 143.

Typically, voice communication is performed in 3G or 4G. This is because 2G does not support voice communication. Therefore, the communication unit 143 cannot transmit voice data in 2G of the telecommunications carrier A or 2G of the telecommunications carrier B among the six communication modes indicated in Table 1. In the example illustrated in FIG. 10, information on 2G of the telecommunications carrier A and 2G of the telecommunications carrier B is stored in the storage unit 137 as information on the connection prohibition mode for voice data.

The selecting unit 133 determines whether or not data to be transmitted to outside by the communication unit 143 includes voice data (S801). When transmission data includes voice data, the selecting unit 133 excludes the connection prohibition mode from selection candidates for the connection mode (S802). In the example described in the present embodiment, when transmission data includes voice data, 2G of the telecommunications carrier A and 2G of the telecommunications carrier B are excluded from the selection candidates. When transmission data does not include voice data, the selecting unit 133 excludes neither 2G of the telecommunications carrier A nor 2G of the telecommunications carrier B from the selection candidates.

The selecting unit 133 then determines whether or not the second priority list is stored in the storage unit 137 (S803). When the second priority list is not stored in the storage unit 137, the selecting unit 133 selects the connection mode on the basis of the first priority list (S804). Meanwhile, when the second priority list is stored in the storage unit 137, the selecting unit 133 selects the connection mode on the basis of the second priority list (S805). That is, in S805, when data to be transmitted by the communication unit 143 includes voice data, the selecting unit 133 selects a communication mode listed on the top in the second priority list from the above-described six communication modes except the connection prohibition mode, as the connection mode. Meanwhile, when data to be transmitted by the communication unit 143 does not include voice data, the selecting unit 133 selects a communication mode listed on the top in the second priority list from the above-described six communication modes, as the connection mode.

Figure 11:
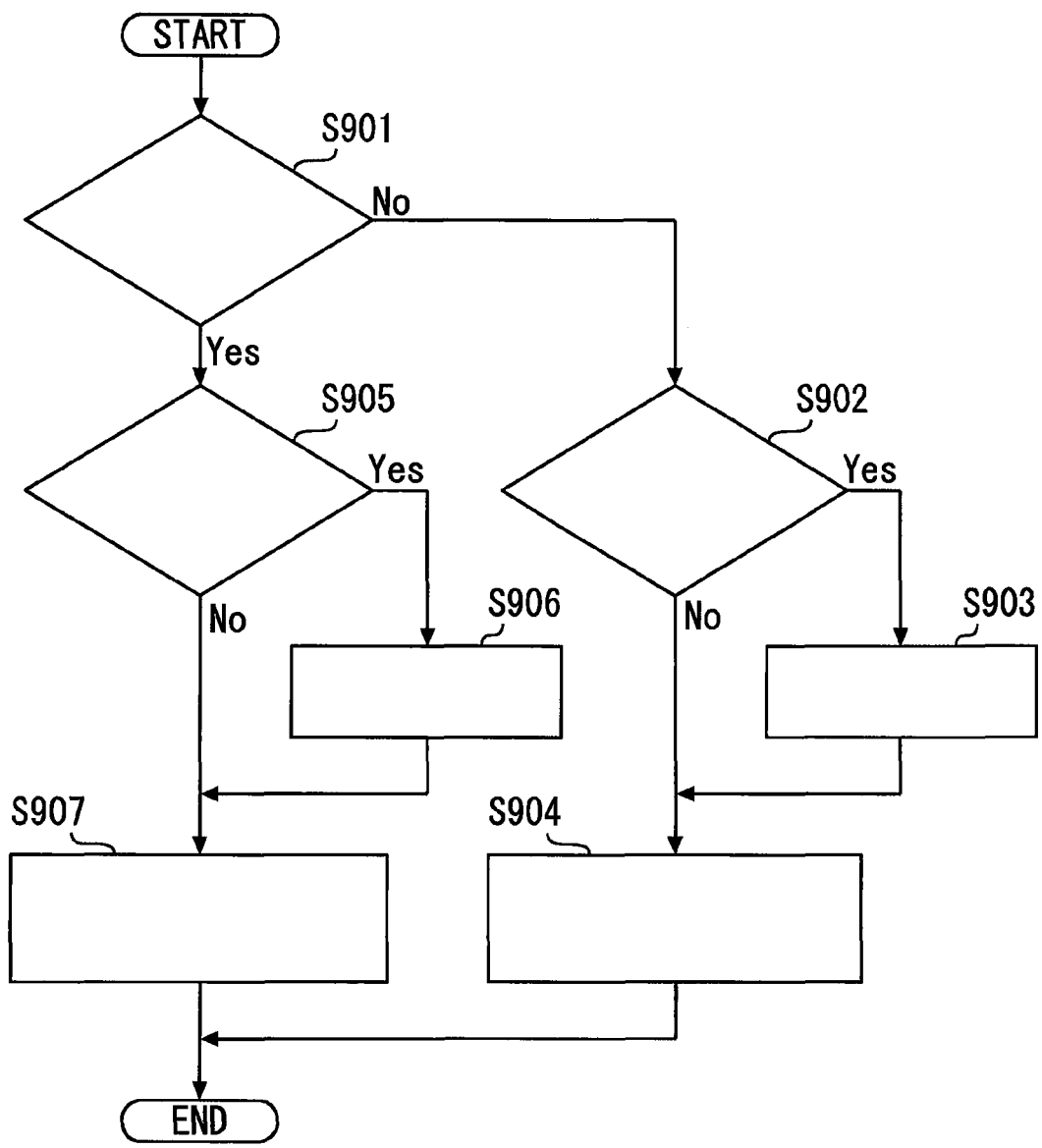
FIG. 11 is a flowchart illustrating another selection example of the connection mode.

FIG. 11 is a flowchart illustrating another selection example of the connection mode. FIG. 11 illustrates processing details to be performed in S302. In the example illustrated in FIG. 11, the monitoring controller 130 includes the correcting unit 136. The correcting unit 136 corrects the priority set by the priority setting unit 134. The correcting unit 136 corrects the priority on the basis of types of data to be transmitted by the communication unit 143.

In the example illustrated in FIG. 11, the selecting unit 133 determines whether or not the second priority list is stored in the storage unit 137 (S901). When the second priority list is not stored in the storage unit 137, the selecting unit 133 determines whether or not data to be transmitted to outside by the communication unit 143 includes voice data (S902). When transmission data does not include voice data, the selecting unit 133 selects the connection mode on the basis of the first priority list (S904). For example, the selecting unit 133 selects a communication mode listed on the top in the first priority list, as the connection mode.

When transmission data includes voice data in S902, the correcting unit 136 corrects the priority set by the priority setting unit 134. That is, the first priority list is corrected by the correcting unit 136 (S903). It is typically said that, in a case where an analog call terminal is used, voice is clearer in voice communication in 4G than in voice communication in 3G. Therefore, if the first evaluation value and the second evaluation value are the same value, the correcting unit 136 corrects the priority so that priority of 4G is set higher than priority of 3G. For example, 4G is made more likely to be selected as the connection mode than 3G by a correction value being added to the second evaluation value or the first evaluation value of 4G.

Note that, when correction is performed by the correcting unit 136, priority itself does not have to be always changed by the correction. Furthermore, because voice communication is possible even in 3G, it is not necessary to specify 3G as the connection prohibition mode.

When transmission data includes voice data in S902, the selecting unit 133 selects the connection mode on the basis of the first priority list corrected by the correcting unit 136 (S904). For example, the selecting unit 133 selects a communication mode listed on the top in the first priority list corrected by the correcting unit 136 as the connection mode.

Meanwhile, also in a case where the second priority list is described in the storage unit 137, the selecting unit 133 determines whether or not data to be transmitted to outside by the communication unit 143 includes voice data (S905). When transmission data does not include voice data, the selecting unit 133 selects the connection mode on the basis of the second priority list (S907). For example, the selecting unit 133 selects a communication mode listed on the top in the second priority list as the connection mode.

When transmission data includes voice data in S905, the correcting unit 136 corrects the priority set by the priority setting unit 134. That is, the second priority list is corrected by the correcting unit 136 (S906). If the first evaluation value and the second evaluation value are the same value, the correcting unit 136, for example, corrects the priority so that priority of 4G becomes higher than priority of 3G. For example, 4G is made more likely to be selected as the connection mode than 3G by a correction value being added to the second evaluation value or the first evaluation value of 4G.

When transmission data includes voice data in S905, the selecting unit 133 selects the connection mode on the basis of the second priority list corrected by the correcting unit 136 (S907). For example, the selecting unit 133 selects a communication mode listed on the top in the second priority list corrected by the correcting unit 136, as the connection mode.

In the present monitoring system, if, for example, the communication unit 143 can perform wireless communication only in one communication mode for each telecommunications carrier, selection of the communication mode by the selecting unit 133 is synonymous with selection of the telecommunications carrier. A case will be considered where the communication unit 143 can perform wireless communication in two communication modes, for example, 3G of the telecommunications carrier A and 3G of the telecommunications carrier B. In such a case, the present monitoring system can be also expressed as follows.

That is, the communication unit 143 can perform wireless communication with a plurality of base stations. For example, the communication unit 143 can perform wireless communication with the base station 501 of the telecommunications carrier A and the base station 502 of the telecommunications carrier B. The selecting unit 133 selects a base station with which the communication unit 143 is to perform wireless communication from the above-described plurality of base stations. In the following description, a base station with which the communication unit 143 is to perform wireless communication will be also expressed as a "connection base station". The selecting unit 133 selects the connection base station from among a plurality of base stations with which the communication unit 143 can perform wireless communication.

The selecting unit 133 selects one base station as the connection base station on the basis of the first evaluation value and the second evaluation value. As described above, the first evaluation value is a value indicating strength of a radio wave received by the communication unit 143. The measuring unit 141 measures strength of a radio wave received from the base station 501. By this means, the first evaluation value for 3G of the telecommunications carrier A is obtained. Also, the measuring unit 141 measures strength of a radio wave received from the base station 502. By this means, the first evaluation value for 3G of the telecommunications carrier B is obtained. The second evaluation value is similar to that in the example described above.

The selecting unit 133 selects the connection base station using a method similar to one of the methods for selecting the connection mode described above. Information of a connection prohibition base station may be stored in the storage unit 137. The connection prohibition base station is a base station with which the communication unit 143 is prohibited from performing wireless communication. For example, the information on the connection prohibition base station is provided from the data center 200. The monitoring device 120 stores the information on the connection prohibition base station received from the data center 200 in the storage unit 137. In a case where the monitoring controller 130 includes the specifying unit 135, the specifying unit 135 specifies the connection prohibition base station using a method which is the same as one of the methods for specifying the connection prohibition mode described above. The data center 200 may have a function of specifying the connection prohibition base station.

The communication unit 143 transmits data to outside of the building 100 via the base station selected by the selecting unit 133, that is, the connection base station. For example, the communication unit 143 transmits the state data collected by the data collecting unit 131 to the data center 200 via the connection base station. The communication unit 143 transmits voice data from the intercom 113 input to the intercom control unit 132 to the information center 300 via the connection base station. In a case where one center has a function as the data center 200 and a function as the information center 300, the communication unit 143 transmits the state data collected by the data collecting unit 131 to the center via the connection base station. The communication unit 143 transmits the voice data from the intercom 113 input to the intercom control unit 132 to the center via the connection base station.

Note that, in the monitoring system described in the present embodiment, voice data is transmitted from the communication unit 143 of the communication device 140. As described above, if fluctuation, or the like, occurs when communication of voice data is performed, conversation between a person inside the car 111 and the operator 311 cannot be established. An analog telephone (not illustrated) may be further provided at the information center 300 in preparation for emergencies in which the second evaluation value falls below a reference value in any communication mode in which the communication unit 143 can perform wireless communication. In such a case, analog data is input to the intercom control unit 132 from the intercom 113 as voice data. The communication unit 143 transmits the voice data which is analog data from the intercom control unit 132 as is to the analog telephone at the information center 300.

In the present embodiment, an example has been described where the selecting unit 133 selects the connection mode on the basis of both the first evaluation value and the second evaluation value. The selecting unit 133 may select the connection mode on the basis of the first evaluation value and the connection prohibition mode without using the second evaluation value. In such a case, the priority setting unit 134 sets priority for each of the communication modes on the basis of the first evaluation value. The information on the connection prohibition mode is stored in the storage unit 137. The selecting unit 133 selects a communication mode listed on the top in the first priority list from the above-described six communication modes except the connection prohibition mode, as the connection mode. That is, a certain effect can be expected even in a case where it is determined as No in S501 in FIG. 7. Also, a certain effect can be expected even in a case where it is determined as No in S803 in FIG. 10.

Furthermore, in a case where the monitoring controller 130 includes the correcting unit 136, the selecting unit 133 may select the connection mode without using the second evaluation value. In such a case, the priority setting unit 134 sets priority for each of the communication modes on the basis of the first evaluation value. The correcting unit 136 corrects the priority set by the priority setting unit 134 on the basis of types of the data to be transmitted by the communication unit 143. The selecting unit 133 selects a communication mode listed on the top in the first priority list corrected by the correcting unit 136, as the connection mode. That is, even in a case where it is determined as No in S901 in FIG. 11, a certain effect can be expected.

Figure 12:
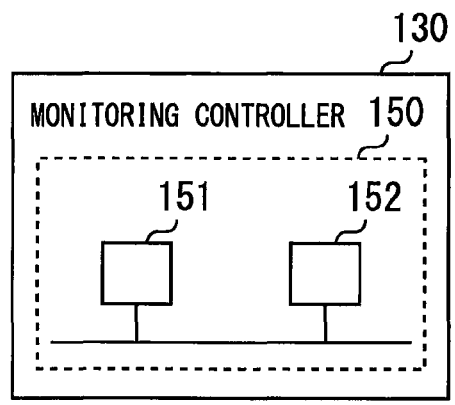
FIG. 12 is a view illustrating an example of hardware resources of a monitoring controller.

In the present embodiment, each of the units indicated with reference numerals 131 to 137 indicates a function included in the monitoring controller 130. FIG. 12 is a view illustrating an example of hardware resources of the monitoring controller 130. The monitoring controller 130 includes processing circuitry 150 including, for example, a processor 151 and a memory 152 as hardware resources. A function of the storage unit 137 is realized by the memory 152. The monitoring controller 130 realizes a function of each of the units indicated with the reference numerals 131 to 136 by the processor 151 executing a program stored in the memory 152.

The processor 151 is also referred to as a CPU (Central Processing Unit), a central processor, a processing device, an arithmetic device, a microprocessor, a microcomputer or a DSP. As the memory 152, a semiconductor memory, a magnetic disk, a flexible disk, an optical disk, a compact disk, a mini disk or a DVD may be employed. The semiconductor memory which can be employed includes a RAM, a ROM, a flash memory, an EPROM, an EEPROM, or the like.

Figure 13:
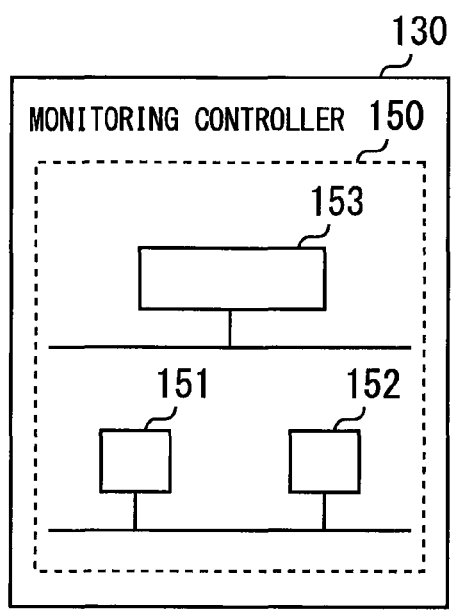
FIG. 13 is a view illustrating another example of hardware resources of the monitoring controller.

FIG. 13 is a view illustrating another example of hardware resources of the monitoring controller 130. In the example illustrated in FIG. 13, the monitoring controller 130 includes processing circuitry 150 including, for example, a processor 151, a memory 152 and dedicated hardware 153. FIG. 13 illustrates an example where part of the functions of the monitoring controller 130 is realized with the dedicated hardware 153. All of the functions of the monitoring controller 130 may be realized with the dedicated hardware 153. As the dedicated hardware 153, a single circuit, a composite circuit, a programmed processor, a parallel-programmed processor, an ASIC, an FPGA or combination thereof can be employed.

In a similar manner, each of the units indicated with reference numerals 141 to 143 indicates a function included in the communication device 140. Hardware resources of the communication device 140 are similar to those in the example illustrated in FIG. 12. The communication device 140 includes processing circuitry including, for example, a processor and a memory, as hardware resources. The communication device 140 realizes a function of each of the units indicated with the reference numerals 141 to 143 by the processor executing a program stored in the memory. The communication device 140 may include processing circuitry including a processor, a memory and a dedicated hardware as hardware resources. Furthermore, all of functions of the communication device 140 may be realized with dedicated hardware.

In the present embodiment, an example where the monitoring device 120 includes the monitoring controller 130 and the communication device 140 has been described. For example, the communication device 140 is connected to the monitoring controller 130 in a wired manner. As another example, the monitoring device 120 may be one device having functions of the monitoring controller 130 and functions of the communication device 140. In such a case, hardware elements of the monitoring device 120 are similar to those in the example illustrated in FIG. 12. That is, the monitoring device 120 includes processing circuitry including, for example, a processor and a memory, as hardware resources. The monitoring device 120 realizes each function by the processor executing a program stored in the memory. The monitoring device 120 may include processing circuitry including a processor, a memory and dedicated hardware as hardware resources. Furthermore, all of the functions of the monitoring device 120 may be realized with the dedicated hardware.

INDUSTRIAL APPLICABILITY

The present invention can be applied to a device which monitors an elevator.

REFERENCE SIGNS LIST 100 building,
110 elevator,
111 car,
112 controller,
113 intercom,
120 monitoring device,
130 monitoring controller,
131 data collecting unit,
132 intercom control unit,
133 selecting unit,
134 priority setting unit,
135 specifying unit,
136 correcting unit,
137 storage unit,
140 communication device
141 measuring unit,
142 measuring unit,
143 communication unit,
150 processing circuitry,
151 processor,
152 memory,
153 dedicated hardware,
200 data center,
210 server,
211 database,
300 information center,
310 monitoring terminal,
311 operator,
320 telephone,
401 IP network,
402 IP network,
501 base station,
502 base station,
600 worker

The invention claimed is:

1. A monitoring device which is provided at a building in which an elevator is provided and which communicates with a center via an IP network, the monitoring device comprising:
   circuitry
   to be able to perform wireless communication in a plurality of wireless communication modes;
   to select a selected wireless communication mode to be used to perform wireless communication from among the plurality of wireless communication modes on the basis of a first evaluation value indicating strength of a radio wave received by the monitoring device and a second evaluation value indicating communication quality between the monitoring device and the center;
   to determine whether data indicating a state of the elevator includes voice data; and
   to transmit the data indicating the state of the elevator to the center in the selected wireless communication mode, wherein
   the circuitry selects the selected wireless communication mode based on a result of the determination of whether the data to be transmitted includes voice data.

2. The monitoring device according to claim 1, wherein the center includes a data center having a database and an information center at which an operator is present,
   the second evaluation value indicates communication quality between the monitoring device and the data center, and
   the circuitry is configured to transmit state data indicating a state of the elevator to the data center in the selected wireless communication mode and transmit voice data to the information center in the selected wireless communication mode.

3. The monitoring device according to claim 1, wherein the circuitry is configured to set priority for each of the plurality of wireless communication modes on the basis of the first evaluation value and the second evaluation value, and
   the circuitry is configured to select a wireless communication mode for which the set priority is the highest among the plurality of wireless communication modes, as the selected wireless communication mode.

4. The monitoring device according to claim 3, wherein the circuitry is configured to store information on a connection prohibition mode,
in a case where data to be transmitted includes voice data, the circuitry is configured to select a wireless communication mode for which the set priority is the highest among the plurality of wireless communication modes except the connection prohibition mode, as the selected communication mode, and
in a case where data to be transmitted does not include voice data, the circuitry is configured to select a wireless communication mode for which the set priority is the highest among the plurality of wireless communication modes as the selected wireless communication mode.

5. The monitoring device according to claim 1, wherein the plurality of wireless communication modes are wireless communication modes each using a different telecommunications carriers.

6. The monitoring device according to claim 1, wherein the plurality of wireless communication modes are wireless communication modes each using a different communication standard.

7. The monitoring device according to claim 1, wherein the plurality of wireless communication modes are digital wireless communication modes.

8. The monitoring device according to claim 1, wherein the circuitry is configured to store information indicating that one of the plurality of wireless communication modes is a connection prohibition mode,
in a case where the data to be transmitted includes voice data, the circuitry is configured to select a wireless communication mode for which a set priority is the highest among the plurality of wireless communication modes except the connection prohibition mode, as the selected communication mode.

9. The monitoring device according to claim 1, wherein the circuitry is configured to store information indicating that one of the plurality of wireless communication modes is a connection prohibition mode,
in a case where the data to be transmitted does not include voice data, the circuitry is configured to select a wireless communication mode for which a set priority is the highest among the plurality of wireless communication modes as the selected wireless communication mode.

10. A monitoring device which is provided at a building in which an elevator is provided and which communicates with a center via an IP network, the monitoring device comprising:
circuitry
to be able to perform wireless communication in a plurality of communication modes;
to select a selected communication mode to be used to perform wireless communication from among the plurality of communication modes on the basis of a first evaluation value indicating strength of a radio wave received by the monitoring device and a second evaluation value indicating communication quality between the monitoring device and the center; and
to transmit voice data and state data indicating a state of the elevator to the center in the selected communication mode, wherein
a way of selecting the selected communication mode depends on whether data to be transmitted includes voice data,
the circuitry is configured to set priority for each of the plurality of communication modes on the basis of the first evaluation value and the second evaluation value, and
the circuitry is configured to select a communication mode for which the set priority is the highest among the plurality of communication modes, as the selected communication mode,
the circuitry is configured to store information on a connection prohibition mode,
in a case where data to be transmitted includes voice data, the circuitry is configured to select a communication mode for which the set priority is the highest among the plurality of communication modes except the connection prohibition mode, as the selected communication mode, and
in a case where data to be transmitted does not include voice data, the circuitry is configured to select a communication mode for which the set priority is the highest among the plurality of communication modes as the selected communication mode.

* * * * *